(12) United States Patent
Osborn

(10) Patent No.: US 8,786,544 B1
(45) Date of Patent: Jul. 22, 2014

(54) LOW RSI ABSOLUTE COORDINATE MOUSE USING OPTICAL THREE-DIMENSIONAL SENSING WITH MOUSE CLICK FUNCTIONS

(71) Applicant: John J. Osborn, San Anselmo, CA (US)

(72) Inventor: John J. Osborn, San Anselmo, CA (US)

(*) Notice: Subject to any disclaimer, the term of this patent is extended or adjusted under 35 U.S.C. 154(b) by 5 days.

(21) Appl. No.: 13/815,771

(22) Filed: Mar. 15, 2013

Related U.S. Application Data

(60) Provisional application No. 61/743,461, filed on Sep. 5, 2012.

(51) Int. Cl.
  *G09G 5/00* (2006.01)
  *G06F 3/0346* (2013.01)
(52) U.S. Cl.
  CPC .................................... *G06F 3/0346* (2013.01)
  USPC ............................. 345/156; 345/163; 341/20
(58) Field of Classification Search
  USPC ...................... 345/156, 163; 341/20
  See application file for complete search history.

(56) References Cited

U.S. PATENT DOCUMENTS

| | | | | |
|---|---|---|---|---|
| 6,061,004 A | * | 5/2000 | Rosenberg | 341/20 |
| 7,253,803 B2 | * | 8/2007 | Schena et al. | 345/163 |
| 2005/0243074 A1 | * | 11/2005 | Osborn | 345/184 |

* cited by examiner

*Primary Examiner* — Jonathan Boyd
(74) *Attorney, Agent, or Firm* — Michael A. Kaufman, Esq.

(57) ABSTRACT

An absolute coordinate pointing device defines an (x,y) plane drawing region wherein user manipulation of a control element controls (x,y) location of first light source optical energy detectable by a first light sensor array that outputs (x,y) Cartesian coordinate data representing control element (x,y) movement. A pantograph coupled between the control element and first light source optical energy provides scaling. Pointing device (x,y) data output can control cursor position on a companion device display screen. Control element location on the drawing region is commensurate with cursor location on the display screen. Optionally an additional pantograph member can pivot in the z-direction with z-displacement of the control element. Z-axis location of optical energy from a second light source moves with z-movement of this pivoting member. A second light sensor array senses this optical energy and outputs z-axis Cartesian coordinate data representing control element z-displacement.

20 Claims, 12 Drawing Sheets

LOW RSI ABSOLUTE COORDINATE MOUSE USING OPTICAL THREE-DIMENSIONAL SENSING WITH MOUSE CLICK FUNCTIONS

PRIORITY TO APPLICATION

Priority is claimed from applicant's U.S. provisional patent application Ser. No. 61/743,461 filed 5 Sep. 2012 entitled "Low RSI Absolute Coordinate Mouse Using Optical Three-Dimensional Sensing With Mouse Click Functions".

FIELD OF THE INVENTION

The invention relates generally to mouse-like pointing devices that can manipulate a computer cursor and provide absolute coordinate characteristic and three-dimensional sensing using optical light sensing with a low cost, light weight configuration with a readily manipulated control element that can reduce repetitive stress injury (RSI).

BACKGROUND OF THE INVENTION

Pointing devices for use with computers and other companion electronic equipment are known in the art and include trackballs, joysticks, and variations of the computer "mouse". Typically such devices require that the user move one element (often the entire mouse) to control a cursor on a computer display, and then press or activate separate buttons to accomplish so-called "left-clicks" and "right-clicks". Further it is common that the user must hold such devices in a fairly rigid position during use. While such tasks may not be overly challenging for many users, these tasks can be overwhelming to handicapped users. Further, such pointing devices are not absolute coordinate devices because the user cannot tell by looking at the device where on the computer display the cursor may be found.

Conventional pointing devices include at least one user-activated button, for example one button to left-click (and left double-click) and perhaps a second button to right-click. These different click functions can command different computer functions. "Left-click" and "right-click" buttons are commonly located on the upper mouse surface, and are pressed, respectively, with the second and third fingers of the user's hand.

Grasping and moving a mouse or trackball to manipulate a cursor, and then having to move a finger to click buttons may literally be impossible if the user suffers from carpal tunnel syndrome, arthritis, perhaps has a hand prosthesis, or is otherwise handicapped. A generic mouse is perhaps 2" wide, 5" long, and 1" in height and has a mass of about 4 oz. Using the mouse to move a computer cursor on a display requires that the user move the entire mass of the mouse, e.g., about 4 oz. plus the weight of the user's hand, perhaps a total of 10 oz. When such movements are repeated many hours a day, many days a week, repetitive stress injury (RSI) including tendonitis, carpel tunnel syndrome, etc., can readily result. At fault is the sheer repetitiveness of user-interaction, coupled with the amount of user-generated force associated with manipulating the mass associated with the mouse.

Prior art pointing mechanisms such as digitizer tablets can provide some absolute coordinate information, but only while the digitizer stylus is in contact with the tablet surface. For instance if the stylus is contacting the upper right corner of the tablet, the user knows that the cursor will be in the upper right corner of the associated computer display. However as soon as the stylus is lifted from the digitizer tablet, the user can no longer look at the tablet and discern where on the computer display the cursor will be found. The stylus often functions as the user-interface element to manipulate the cursor, and typically can be used to emulate left mouse-clicking.

Applicant's U.S. Pat. No. 7,126,582 (2006) "Absolute Coordinate, Single User-Interface Element Pointing Device" and applicant's U.S. Pat. No. 7,538,758 (2009) described absolute coordinate pointing devices that are readily manipulated by handicapped users. Rather than manipulate a 4 oz. mouse mass with an arm and hand, these Osborn type pointing devices enable the user to use a single control element to move a lightweight film with respect to a stationary optical sensor within the device to reposition a computer cursor. The mass of the moved film typically is only about 4% or so of the mass required for movement with a conventional mouse. Manipulation is with the user's finger(s) rather than with the user's arm and hand. The greatly reduced mass required to be moved, as well as the ability to make mouse-type clicks with the single control element greatly reduces repetitive stress, and the likelihood of resultant injury to the user. Further, the Osborn pointing devices described in the '582 patent and '758 patent are absolute coordinate mechanisms. As such, a user can look at the device and know approximately where on the computer screen the cursor will be found.

What is needed is an low movable mass, absolute coordinate pointing device using a simpler (x,y) position, and preferably an (x,y,z) position, sensing unit that outputs true mouse positional data to a companion device, such as a computer, kiosk, etc. Preferably such pointing device should be scalable to enable a user to trace a given curve, perhaps a mathematical function f(t), and thus create the curve with dimensions on a computer screen, where it could be manipulated by an accompanying computer. In addition, such pointing device should be manipulable with a user's finger(s) rather than with the user's arm, hand and wrist. Preferably the device enables lifting to control element in the z-axis to implement three-dimensional functionality. The present invention provides such a pointing device.

SUMMARY OF THE INVENTION

The present invention provides an absolute coordinate mouse device with three-dimensional (x,y,z) sensing and curve tracing functionality for use with a companion device, e.g., a PC, a netbook or laptop computer, a kiosk, etc. User manipulation of a single control element in the (x,y) plane results in scalable manipulation of an exit location for movement of optical energy output from a first light source relative to a stationary first light sensor array of light pixels (light sensor array). Optical energy from the first light sensor can be coupled directly or via fiber optic cable for presentation at an exit location to the first light sensor array. As the user moves the control element in the (x,y) plane, the exit location of optical energy from the first light source is moved in the (x,y) plane relative to the stationary first light sensor array. The first light sensor array senses optical energy rays emitted by the first light source and can thus output (x,y) Cartesian coordinate data commensurate with (x,y) movement of the control element in the (x,y) plane. Consequently a preferable scaled locus of the (x,y) movement of the control element is traced by light emitted from the first light source falling upon the first light sensor array. Preferably optical energy emitted by the first light source is a pinpoint of light. A scaling mechanism, e.g., a pantograph, may be mechanically coupled between the control element and the optical energy emissions from the first light source. Responsive to detected light from the first light source, the first light sensor array outputs direct (x,y) Cartesian coordinate data to the companion device. In an alternative embodiment, the first light sensor array is scalably moved relative a stationary first light source. Mouse clicking may be implemented using a microswitch that is opened or closed responsive to user lifting of the control element in the vertical z-dimension.

In some embodiments movement of the single control element in the z-direction is detected, in addition to detecting (x,y) control element movement. Z-detection movement is detected by providing the scaling mechanism, e.g., a pantograph mechanism, with an additional member that is hingedly attached at one end to the pantograph for vertical pivoting movement, and is attached at the other end to the control element. As such this additional member can hinge upward or downward in the z-direction as the control element is moved upward or downward, but this member is constrained from pivoting in the (x,y) plane. This embodiment also includes a second light source and a second light sensor array. The exit location of optical energy rays from this second light source is moved vertically with this member as the control element is moved vertically by the user of the device. The second light sensor array, is disposed in a plane orthogonal to the x-y plane, and preferably is attached to a lower member of the pantograph, which lower member can move only in the (x,y) plane. The second light sensor array is moved freely with this lower pantograph member as the pantograph is moved by the control element in the (x,y) plane by the user. However as this lower pantograph member cannot move vertically there is no vertical movement of the second light sensor array. As the control element is lifted in the z-direction through a lift angle φ, the vertically pivotable member moves vertically, as does the exit location for optical energy from the second light source. Thus optical energy from the second light source is detected at different locations on the second light sensor array. The z-value or z-Cartesian coordinate output from this array is commensurate with the vertical height of the lift of the control element by the user. Output optical energy from the second light source may be coupled via a fiber optic cable attached to the vertically pivotable member to be detected by the second light sensor. Alternatively, the second light sensor array could be attached to the vertically pivotable member, and the second light source could be attached to the lower member of the pantograph.

Output from first light sensor array and output from the second light sensor array provide, respectively, native (x,y) and (z) Cartesian coordinate data commensurate with position of the control element, both in the (x,y) plane and in z-space. This (x,y,z) data can be coupled, wirelessly or otherwise, to control cursor movement or operation of a PC or other electronic companion device. The output (x,y,z) data can control cursor positioning on a display coupled to the companion device, and can control mode selection and other operation of the companion device itself. If needed, software associated with the companion device can compute the actual z-axis lift angle φ using the sinewave function, the z-axis displacement coordinate value from the second light sensor array, and the effective length $L_{eff}$ of the vertically movable member. Software applications executed by the companion device may be programmed to interpret different levels of z-axis displacement output by the absolute coordinate mouse device. The pointing device may include at least one microswitch to detect and indicate mouse clicking movement of the control element. Microswitches may be disposed in the length of the control element, allowing the user to emulate mouse switching even when the control element is lifted upward from the (x-y) plane.

In the present invention, the mass manipulated by the user via the single control element is on the order of about 0.25 oz., compared to the 4 oz. mass of a conventional mouse. Further, the weight of the user's fingers manipulating the mouse is nil, as the hand supports the finger weight, not the mouse. Consequently RSI and other stress factors are substantially reduced using the present invention, perhaps by a factor of ten or more. Whereas a conventional mouse encounters friction as it is moved over a surface, the present invention is substantially frictionless, as no physical contact is required between a light source and an associated light sensor array. The single control element preferably is detachable from the present invention such that a differently shaped control element can be used, as desired by different users. Such control elements can include a ring or a concave cup, such that handicapped individuals with amputated fingers can manipulate the pointing device. Further the present invention provides absolute coordinate information in that the user can look at where the lower end of the control element is relative to the boundary box drawing area and know where the cursor will be on the display associated with the companion device. Even if the user's hand is removed from the control element, absolute (x,y) plane coordinate information is preserved in that the cursor will still remain at a location on the display commensurate with location of the lower end of the control element on the boundary box area. Output from the pointing device can be coupled to a companion device via cable, e.g., USB, PS/2, or wirelessly, e.g., via Bluetooth, IR, etc.

Other features and advantages of the invention will appear from the following description in which the preferred embodiments have been set forth in detail, in conjunction with their accompanying drawings.

BRIEF DESCRIPTION OF THE DRAWINGS

FIG. 3A-1 and FIG. 3A-2 depict exemplary mounting of a second light source and second light sensor array to implement z-axis displacement of a pointing device such as shown in FIG. 3A, according to embodiments of the present invention;

FIG. 3A-3 depicts an exemplary coupling of optical energy rays from a second light source via a fiber optical cable to emerge at an exit location for detection by a second light sensor array, to implement z-axis displacement of a pointing device, such as shown in FIG. 3A, according to embodiments of the present invention;

DETAILED DESCRIPTION OF THE PREFERRED EMBODIMENT

Figure 1A:
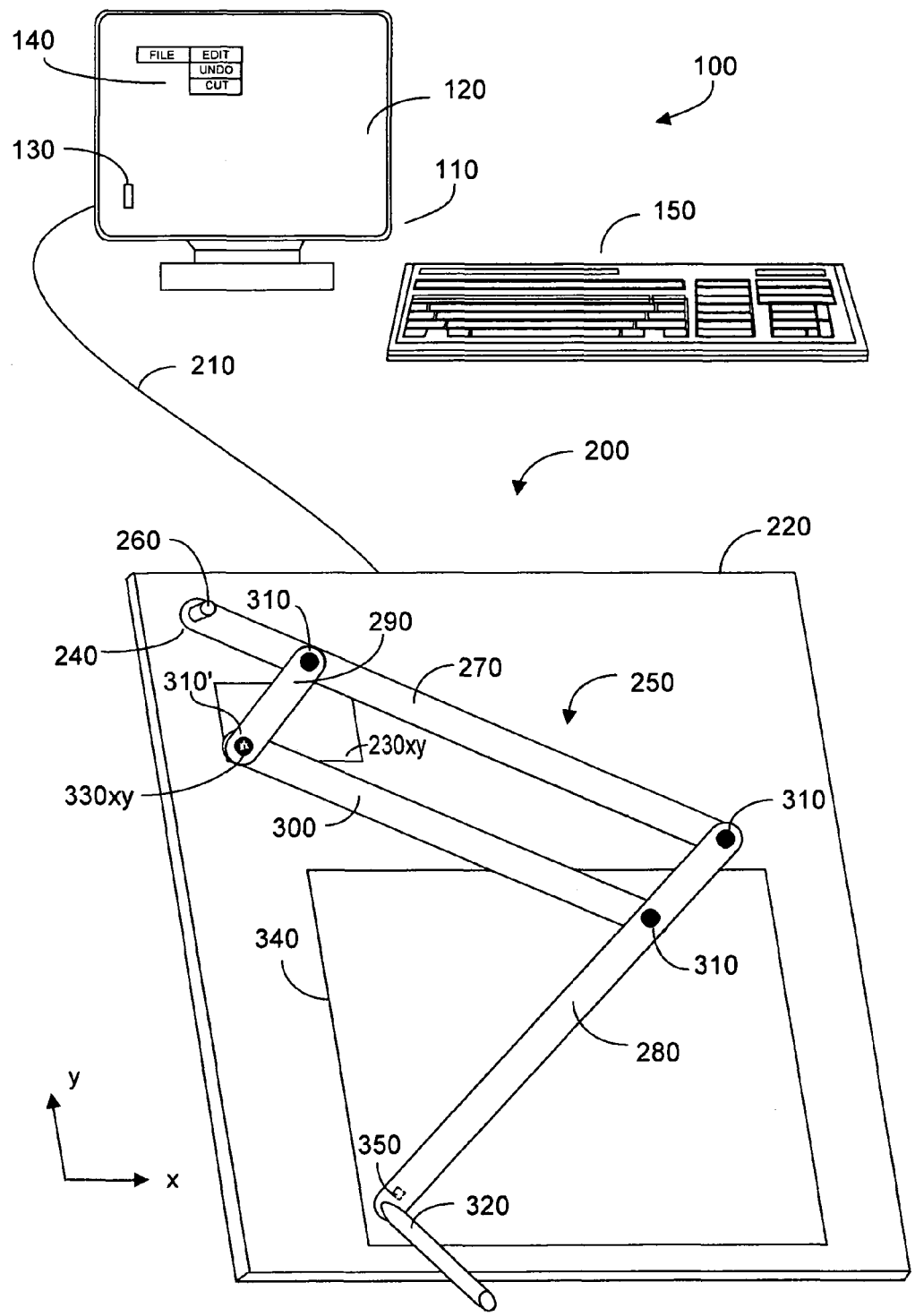
FIG. 1A-FIG. 1D depict a two-dimensional pointing device with the control element moved to various locations on a virtual drawing region and depicting differently configured control elements, according to embodiments of the present invention.

FIG. 1A depicts a companion device that is a conventional computer system 100 that includes a processor unit 110, a monitor display 120 upon whose screen appears a user-movable cursor 130, and perhaps another displayed object, such as menu 140. In FIG. 1A processor unit 110 is contained in a common housing with monitor display 120, although such need not be the case. System 100 also includes a conventional keyboard 150, coupled via a cable (not shown) or wirelessly (via Bluetooth, via IR, etc.) to processor unit 110.

FIG. 1A further shows a pointing device 200, according to the present invention coupled via cable 210 (or perhaps coupled wirelessly via Bluetooth, via IR, etc.) to processor unit 110. If cable 210 is used it can coupled to processor unit 110 via a USB port or the like, from which it can receive operating power as well as provide (x,y) mouse coordinate position to computer system 100. Not shown in FIG. 1A is a protective housing that conceals most of pointing device 200, but for a portion of element 280 including its distal end to which control element 320 is attached. Generally the front end (or perhaps a side edge) of the housing for pointing device 200 will define a slot through which at least a portion of member 280 extends, with control element 320 attached (or attachable) to the distal region of the extending portion of the member. Boundary box 340 may simply be the surface upon which pointing device 200 (and its housing) sits, perhaps the top of a work table.

Pointer device 200 is preferably constructed on a base member to which is affixed a first light sensor array 230$xy$, and one end 240 of a scaler mechanism, such as mechanical pantograph mechanism 250. A swivel mount 260 attaches end 240 of pantograph mechanism 250 to base member 220, enable the pantograph mechanism to be swiveled in the (x,y) plane about swivel mount 260. Pantograph mechanism 250 comprises pantograph elements 270, 280, 290, and 300. Those skilled in the art will recognize that length of member 270 between swivel mount 260 and swivel-permitting rivet 310 coupling member 270 to member 280 will equal length of member 280 between this swivel-permitting rivet 310 and mounting location of control element 320. Swivel-permitting rivets 310 and swivel-permitting rivet 310' or the like enable joined-together pantograph elements to swivel in the (x,y) plane. The distal end of pantograph element 280 is preferably swivalably affixed to a first end of a single control element 320, shown as pencil-shaped, which control element can be manipulated by a user of pointer device 200. The underside of pantograph element 300 near the swivel-permitting rivet coupling together pantograph elements 290 and 300 includes a preferably pin-hole first light source 330$xy$ that is preferably mounted concentrically within the surrounding swivel permitting rivet 310'. Output optical energy from first light source 330$xy$ falls upon and is detected by first light sensor array 230$xy$.

The notation 330$xy$, 230$xy$ denotes that the first light source and first light sensor array detect movement of control element 320 in the (x,y) plane. It is understood that the spaced-apart distance between first light source 330$xy$ and first light sensor array 230$xy$ is as small as practical. There is no physical contact, and thus no friction or wear-and-tear between 330$xy$ and 230$xy$, but for impingement of light rays from 330$xy$ upon 230$xy$. First light source 330$xy$ may be a light emitting diode (LED) or the like with an output wavelength commensurate to what is detectable by first light sensor array 230$xy$.

A virtual bounding box region 340 may be defined in the (x,y) plane on base member 220 as representing the drawing area over which the user can move single control element 320 and affect position of cursor 130 on display screen 120 and/or to control mode and/or operation of companion device 100. Boundary box 340 is simply the area within which the user can manipulate the control element, e.g., 320, in the (x,y) plane. As such it is simply a flat surface within which the control element may be manipulated. If pointing device 200 is placed on a table top, a portion of the table top surface can include the area within boundary box 340. Thus it is not necessary that any housing for pointing device 200 include a front horizontal planar surface to serve as the area within boundary box 340.

The underside of pantograph element 280 near the attachment of control element 320 preferably includes a microswitch 350 whose switch state changes should the user lift control element 320 upward slightly, away from the (x,y) plane, and then push the control element back down to touch the surface of base member 220. A voltage source coupled via wires to microswitch 350 is not shown for ease of illustration. It is understood that if pointing device 200 does not receive electrical power via cable 210 from a USB port or the like, pointing device 200 can include a battery to provide electrical power, the battery not appearing in FIG. 1A. In the various embodiments it is preferred that control element 320 is removably attachable to arm 280. This enables different users to attach differently shaped or configured control elements, if desired. Removable attachment could be implemented by forming a small ball at the attachment end of control element 320 and by forming a mating concave socket at the attachment end of pantograph member 280. Other mechanisms to removably attach control element 320 to pantograph member 280 could of course be employed to enable different users to user differently shaped or configured control elements, as desired. The various members of pantograph mechanisms described may be made from inexpensive light weight material, plastic strips, celluloid strips, for example. In many embodiments it may be desirable that member 280 or the like to which the control element is attached, or attachable, be made from transparent material, to better facilitate use of the present invention for tracing graphs and the like.

In practice, the user holds or otherwise manipulates control element 320 within bounding box 340 within the (x,y) plane of base member 220. Such movement causes the entire pantograph mechanism 250 to move, which causes the (x,y) position of preferably pin-hole first light source 330$xy$ to move scalably, concentrically within hollow rivet 310', relative to first light sensor array 230$xy$. By scalably it is meant that a movement of control element 320 of say 2" may cause first light source 330$xy$ to move by say 0.4", depending upon the geometry of pantograph mechanism 250. Note in FIG. 1D the user has manipulated control element 320 generally toward the left lower corner of bounding box 340. Correspondingly the position of cursor 130 on display screen 110 is in the lower left corner, and will remain there even if the user lets go of control element 320.

Figure 1B:
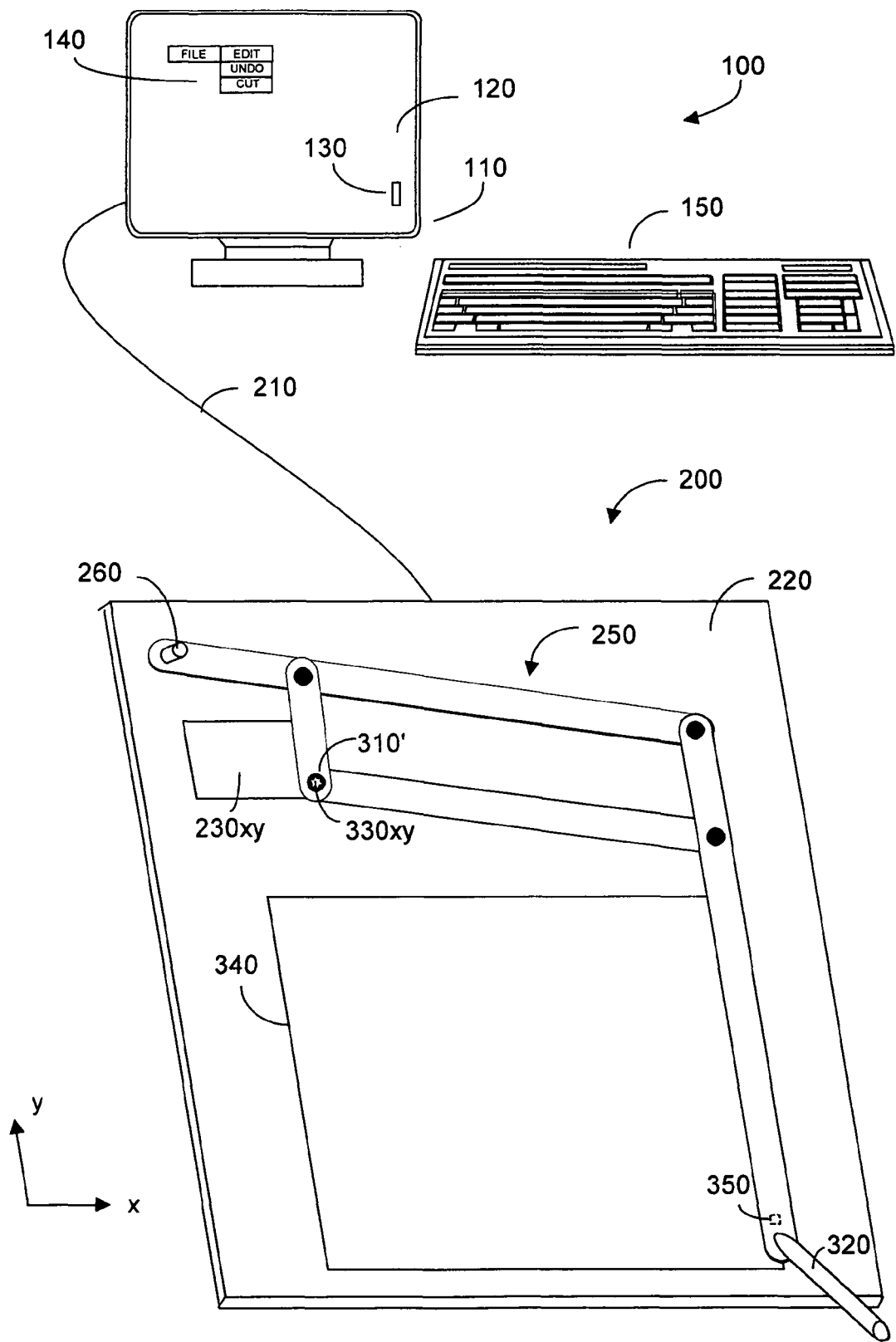

In FIG. 1B the user has manipulated the control element 320 to the lower right corner region of boundary box 340, and correspondingly the position of cursor 130 on display screen 110 is in the lower right corner.

Figure 1C:
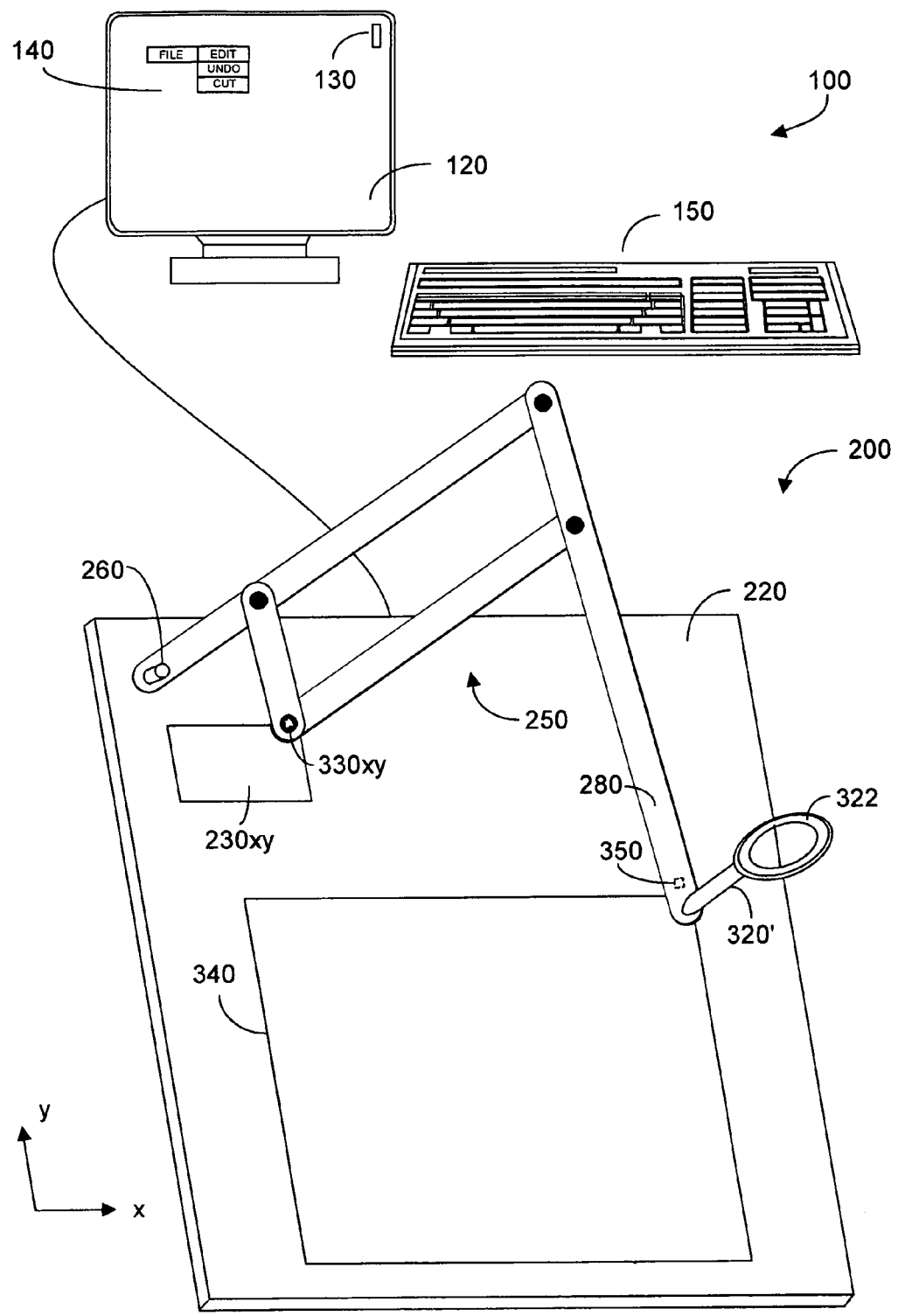

Similarly in FIG. 1C the user has manipulated control element 320 towards the upper right corner region of boundary box 340 and correspondingly the position of cursor 130 is now seen in the upper right corner region of display screen 120. Note in FIG. 1C that a different control element has been attached to the end of pantograph member 280. A control element 320' terminating with an open ring 322 has been attached. Open ring 322 enables users who perhaps cannot grasp control element 320 as shown in FIGS. 1A, 1B, to insert a finger or portion of a finger (or even a toe) through ring 322 to manipulate cursor 130 on display 120.

Figure 1D:
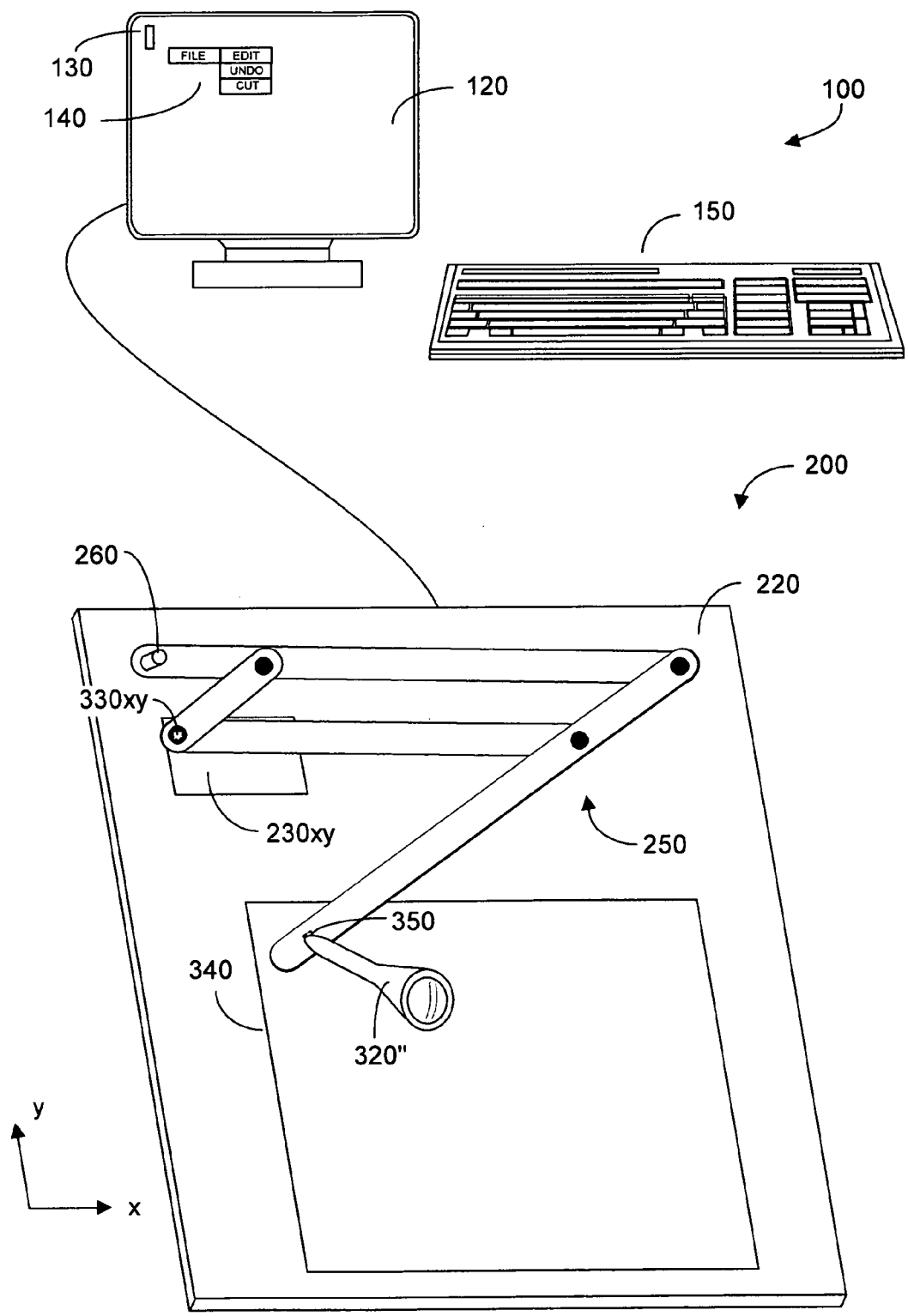

FIG. 1D depicts use of a concave-shaped control element 320", which shape enables users with amputated fingers to manipulate a control element without having to grasp the element. In FIG. 1D control element 320" has been moved by the user to the upper left corner of bounding box 340. Correspondingly, cursor 130 has also been moved and now appears in the upper right corner region of display screen 130.

Scaling mechanisms such as pantograph mechanism 250 are known in the art. Such devices can scale magnitude of (x,y) movement at the distal end of pantograph element 280 to (x,y) movement at location of light source 330xy on the pantograph mechanism. Scaling can be changed by changing relative size of the elements. Preferably the distance along pantograph element 270 between swivel mechanism 260 and pivot rivet 310 is about the same as the distance along pantograph element 280 between the same pivot rivet 310 and the distal end location of control element 320. The length along pantograph element 280 between pivot rivets 310 is preferably equal to the length of pantograph element 290 between pivot rivets 310, and is preferably equal to the distance along pantograph element 270 between swivel point 260 and closest pivot rivet 310. In one embodiment, pantograph elements 270 and 280 were each about 6.75" in length, and pantograph element 290 was about 1.6" in length. Bounding box 340 was about 4" in height and about 6" in length, and first light sensor array 230xy was about 1" in height and about 1.5" in length. Of course other scale factors could be used, to increase or to decrease overall size of pointing device 200.

Figure 2A:
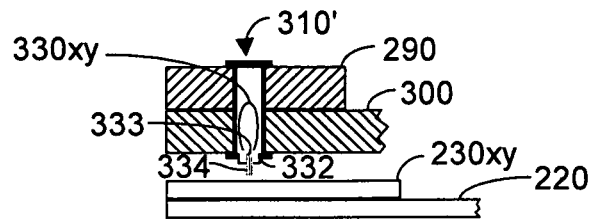
FIG. 2A depicts exemplary mounting of a first light source and pinhole mask to restrict output rays, suitable for pointing devices such as shown in FIG. 1A-FIG. 1D, according to embodiments of the present invention.

Tracking accuracy is promoted by mounting first light source 330xy concentrically within a hollow swivel-permitting rivet 310', and causing this light source to output a relatively narrow beam of light rays 334 that will impinge upon first light sensor 230xy. FIG. 2A depicts an exemplary mounting of first light source 330xy, concentrically within hollow swivel-permitting rivet 310', with a mask 332 that defines a small diameter pinhole opening 333 through which a restricted cross-sectional area of light rays 334 from 330xy pass. The thus restricted rays 334 then impinge upon a region of first light sensor 230xy. As such, rays 334 emerge from what may be termed an exit location, which exit location is moved in the (x,y) plane commensurate with user manipulation of the control element in the (x,y) plane. Pinhole mask 332 may be attached to the lower end of rivet 310' using adhesive or solder, etc. FIG. 2 does not show wires coupled to first light source 330xy or to light sensor array 230xy, for ease of illustration. The entire cylindrical body of rivet 310' need not be hollow as depicted in FIG. 2A, especially if the height of first light source 330xy is less than the top-to-bottom length of rivet 310'. It is understood that the configuration depicted in FIG. 2A is but one example of concentrically mounting first light source 330xy within hollow swivel-permitting rivet 310' and optionally masking emissions from first light source 330xy with a pinhole mask.

Figure 2B:
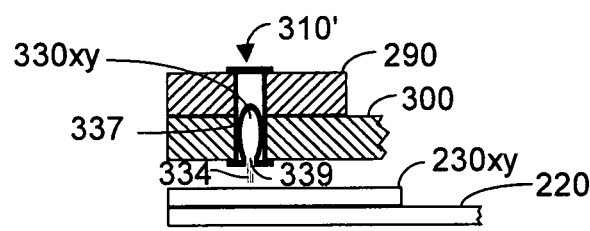
FIG. 2B depicts an exemplary mounting of a first light source and opaque outer surface but for a small opening to restrict output rays, suitable for pointing devices such as shown in FIG. 1A-FIG. 1D, according to embodiments of the present invention.

FIG. 2B depicts an alternative method of masking emissions from light source 330xy. In FIG. 2B, light ray output 234 from source 330xy is restricted in cross-sectional area by painting the outer surface of source 330xy with an opaque material 337, e.g., black paint, and then removing a small area of the opaque material from the lower outer surface region of the distal end of the light source to create a very small transparent opening 339. In such fashion, similar to the use of a pinhole mask 332, a more narrowly defined set of rays 334 from light source 330xy impinge upon light sensor 230xy, here through transparent opening 339. Optical energy rays 334 emerge at what might be termed an exit location, which exit location is moved in the (x,y) plane commensurate with user manipulation of the control element in the (x,y) plane.

Figure 2C:
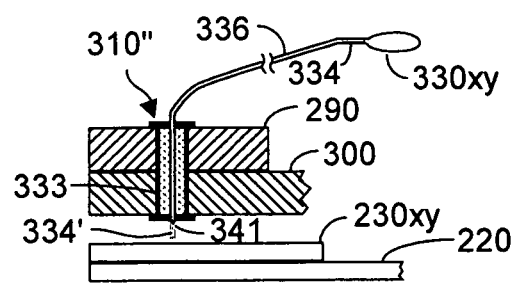
FIG. 2C depicts an exemplary coupling of optical energy rays from a first source via a fiber optic cable to emerge at an exit location for detection by a first light sensor array, suitable for pointing devices such as shown in FIG. 1A-FIG. 1D, according to embodiments of the present invention.

According to embodiments of the present invention, it suffices that optical energy output rays 334 move in the (x,y) plane commensurate with movement of movement of the control element in the (x,y) plane, or if z-axis movement is to be detected, with movement of the control element in the z-axis. As shown in FIG. 2C, a preferably flexible fiber optic cable 336 can couple optical energy 334 emitted by light source 330xy through swivel-permitting rivet 310". In FIG. 2C, rivet 310" is solid but for a channel through which a portion of fiber optic cable 336 passes. An opening 341 in the lower face of rivet 310" allows a fraction 334' of the optical energy rays from light source 330xy to pass and exit, to be detected by light sensor array 230xy. As such the region of fiber optic cable 336 adjacent opening 341 may be termed the exit location of detectable optical energy rays 334'. The nomenclature 334' is used for the optical energy rays falling upon light sensor array 230xy, to represent any attenuation within fiber optical cable 336, as well as the fact that diameter of opening 341 may be made smaller than diameter of fiber optical cable 336. Thus a fraction less than 100% of optical energy rays 334 exiting light source 330xy is presented as detectable exiting optical energy rays 334'. In this embodiment light source 330xy can be mounted where desired, and need not be mounted on or repositioned with movement of any scaling mechanism, e.g., pantograph mechanism 250. For example light source 330xy could be mounted stationary within a housing for the present invention. It is seen from FIG. 2C, that movement of member 290 in the (x,y) plane, resulting from control element 320 movement of member 280 in the (x,y) plane, causes the exit location of optical energy rays from light source 330xy to be moved relative to light sensor 230xy.

Thus far embodiments of the present invention have been described wherein absolute coordinate position in the (x,y) plane is achieved by user manipulation of a single control element. Such (x,y) manipulation of the single control element is sensed by moving an exit location of optical energy rays emitted by a light source relative to a light sensor array, in the x-y plane. Preferably a scaling mechanism is coupled between the single control element to scale corresponding (x,y) movement of the light source relative to the light sensor. Embodiments of the present invention that also enable sensing in the z-dimension, e.g., upwards from the horizontal (x,y) plane, will now be described. Preferably such z-direction movement is also sensed by moving an exit location of optical energy rays emitted by a light source relative to a light sensor, however now in the z-direction.

Figure 3A:
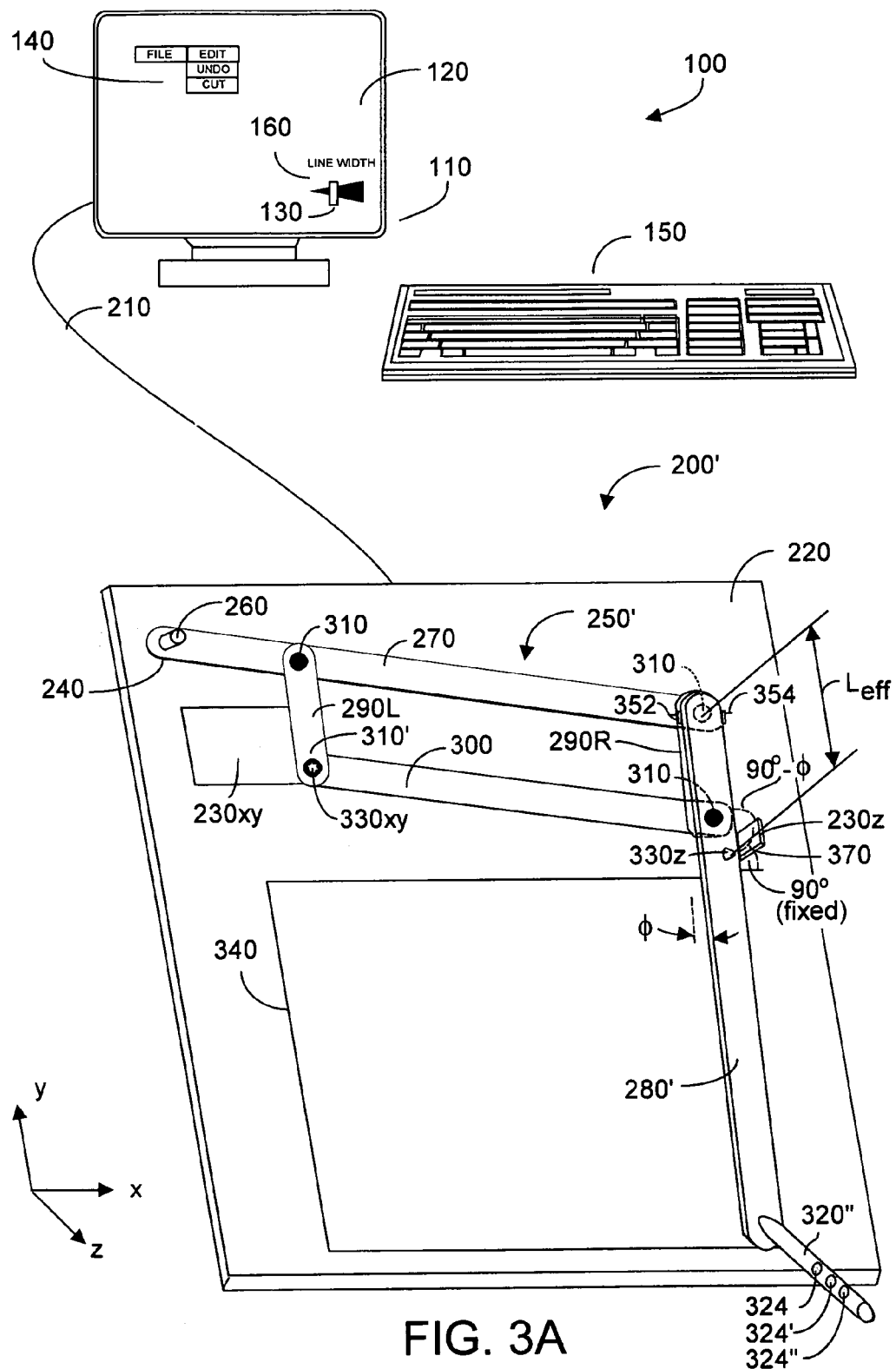
FIG. 3A depicts a three-dimensional pointing device of the type shown in FIGS. 1A-1D, according to embodiments of the present invention.

FIG. 3A depicts an (x,y,z) sensing absolute coordinate device, according to embodiments of the present invention. In FIG. 3A, device 200' senses movement of control element 320" both in the (x,y) plane, as described above with respect to FIG. 1A-FIG. 1D and FIG. 2A-FIG. 2C, and also senses control element 320" movement in the z-axis, upward and normal to the (x,y) plane through a lift angle φ. As was noted, (x,y) plane movement of control element 320" is sensed using relative movement between a first exit location for optical energy rays from a first light source 330xy and first light sensor array 230xy. In FIG. 3A, device 200' includes a second light source 330z, and a second light sensor array 230z that is oriented normal to the (x,y) plane. Second light source 330z may be an LED whose light output wavelength is commensurate with what is detectable by second light sensor array 230z. In most applications only a relatively few degrees of lift (through lift angle φ) need be sensed. Thus second light sensor array 230z may be narrower and shorter than first light sensor array 230xy, being perhaps 0.5" in height (along z-direction) and perhaps about 0.25" to about 0.5" in width (along the y-axis in FIG. 3A). Relative movement between optical energy rays emitted by second light source 330z at a second exit location adjacent second light sensor array 230z and second light sensor array 230z describes an arc-shaped path 370.

The z-axis information provides z-axis positional information and can augment the (x,y) plane positional information provided by first light source 330xy and first light sensor array 230xy. Collectively, device 200' outputs (x,y,z) positional information as Cartesian coordinates, useful to control movement of cursor 130 on monitor display 120 in computer system 100 and/or to command computer system 100 operations. Z-axis movement results from the user (not depicted) lifting control element 320" in the z-axis direction (normal to the (x,y) plane, and thus lifting the distal tip of member 280'. Movement of member 280' moves light source 330z relative to light sensor 230z, whose sensing plane is normal to the (x,y) plane.

Let $L_{eff}$ be the distance between member 280' pivot axis 352 and the second exit location for optical energy from second light source 330z. At a lift angle φ, a right triangle may be defined having hypotenuse equal to $L_{eff}$, and opposite side equal to z. This construction ignores curvature caused by changing distance between the second exit location and plane of the second sensor array. However using mathematics well known to those skilled in the art, corrections can be made to the simplification $\sin(\phi)=z/L_{eff}$. Distance z is the z-Cartesian coordinate output from second light sensor 230z responsive to detection of optical energy from second light source 330z at a second exit location. In FIG. 3A, the second exit location is the physical location of second light source 330z, which is attached to member 280'. In many applications being executed by the host device 100 it suffices for device 200' to export magnitude of z, as part of Cartesian coordinates (x,y,z). However for applications that require knowledge of the angle φ, host device 100 can be provided with a lookup table correlating values of z to values of φ, since $L_{eff}$ is a known constant.

It is understood that light source 330z may be masked or painted, as shown in FIG. 2A or FIG. 2B, to ensure that a narrow beam of emitted light rays are directed towards light sensor 230z. Further, as will be described shortly with respect to FIG. 3A-3, optical energy rays from second light source 330z can be coupled via a preferably flexible fiber optic cable whose terminating end is a second exit location that is moved in the z-direction commensurate with user movement of the control element in the z-direction. It is also understood that there is no physical contact between second light source 330z and second light sensor array 230z but for rays of optical energy emitted from 330z.

Note in FIG. 3A that pantograph mechanism 250' is somewhat modified from mechanism 250 in FIG. 1A-FIG. 1D. Whereas mechanism 250 in FIG. 1A had dissimilarly sized elements 290 and 280, a lower portion of mechanism 250' in FIG. 3A has equally sized elements 290L, 290R that are pivotally joined adjacent their element ends to elements 270, 300. However in addition, there is also an overlying element 280' that is hingedly attached by a hinge mechanism 352 about a pivot axis 354 above the junction of pivotally joined elements 270 and 290R. Control element 320" attaches to the distal end of element 280'. In FIG. 3A, length of member 270 between swivel mount 240 adjacent one end and swivel-permitting rivet 310 adjacent the other end of member 240 will equal length of member 280' between location of the same swivel-permitting rivet 310 and mounting location of control element 320".

When control element 320" is moved by the user in the (x,y) plane, pantograph mechanism 250' is moved about swivel mount axis 260. However hinge mechanism 352 allows element 280' to hinge in a vertical direction through angle φ about pivot axis 354 as the user lifts control element 320", but does not allow (x,y) plane movement of element 280'. Hinge pivot mechanism 352 can literally be a tiny hinge attached between the upper surface of element 270 and the lower surface of element 280', and pivot axis 354 may be defined as the hinge axis of pivot mechanism 352. Mechanism 352 could be a folded piece of flexible resilient material, a plastic perhaps, that permits up/down rotation movement about pivot axis 362 though angle φ, but which material is sufficiently stiff to inhibit left/right movement of the mechanism and of member 280' in the (x,y) plane.

As shown in FIG. 3A, system 200' includes a second light sensor array 230z whose sensor plane is orthogonal to orientation of first light sensor array 230xy, which is to say orthogonal to the (x,y) plane. Preferably the lower edge of array 230z is affixed to an edge of member 230R such that as the pantograph mechanism is moved by control element 320", array 230z is also moved. A second light source 330z is attached to pantograph element 280'. As the pantograph mechanism is moved by the user (not shown) in the (x,y) plane there is no relative movement between light source 330z and sensor array 230xy. But if the user lifts control element 320" upward, i.e., lift angle φ>0°, then the resultant relative movement of light source 330z relative to sensory array 230xy will define an arced locus, shown as 370 having a z-axis height at the maximum value of the lift angle φ. As with (x,y) plane movement, it is relative movement between the second light source and second light sensor array that is detected. Thus one could, if desired, fixedly mount array 230z to member 280' to move pivotably with member 280', and fixedly attach light source 330z a distance above base member 220 equal to about half the height of array 230z. In such embodiment, as the user moved control element 320" vertically, member 280' will pivot vertically about pivot mechanism 352, producing vertical movement of array 230z. This relative movement would produce a measure of vertical displacement z, from which lift angle φ may be derived from the inverse sinusoidal function.

Note in FIG. 3A that control element 320" is shown provided with several user-operable switches 324, 324', 324". Not shown are electrical wires within control element 320" and make electrical contact through pivotable contacts (not shown) in a ball-socket attachment between the lower end of control element 320" and the distal end of element 280'. Also not shown in FIG. 3A are traces or wires within element 280' from control element 320" switches 324, 324', 342", to logic (not shown) associated with device 200'. Alternatively, the hollow region of control element 320" could contain a Blue-Tooth transmitter coupled to switches 324, 324', 324", and could contain hearing aid sized batteries to power the transmitter. In this fashion, user-pressed switch commands, e.g., perhaps equivalent to left-mouse click using switch 324, right-mouse click using switch 324', double-mouse click using switch 324" could be wirelessly communicated to companion device 100, here a computer system. Coupling cable 210, unless obviated by providing device 200' with wireless BlueTooth or equivalent transmission capability, carries (x,y,z) information to computer system 100 as well as relevant switching information from switches 324, 324', 324".

In FIG. 3A, control element 320" is shown disposed generally in the lower right hand corner of bounding box region 340, and accordingly cursor 130 will be found in the lower right hand corner of monitor display 120. Note that monitor display 120 shows a "line width" wedge-shaped region 160. By way of example, in a computer drawing application where widths of drawn lines are user-selectable, user lifting of control element 320" can invoke the line width choice menu option 160. Lifting control element 320" slightly, perhaps a lift angle $\phi=2°$ or so might call out a narrow line width, whereas lifting the control element higher, through a larger lift angle $\phi$, would call out a fatter line width. It is understood that in most applications a relatively small magnitude of $\phi$ will suffice, and maximum $\phi$ in most applications will be on the order of a few degrees or so. In this example, as the user lifts the control element vertically over varying line thicknesses, the user can perhaps press button 322 on the control element to make the line selection thickness. Buttons 322', 322" might be used for left and right mouse click emulation, etc.

Figures 1, 3A:
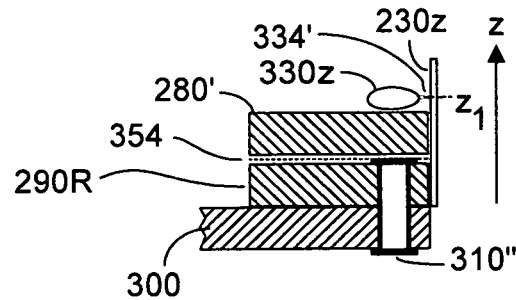
Figures 2, 3A:
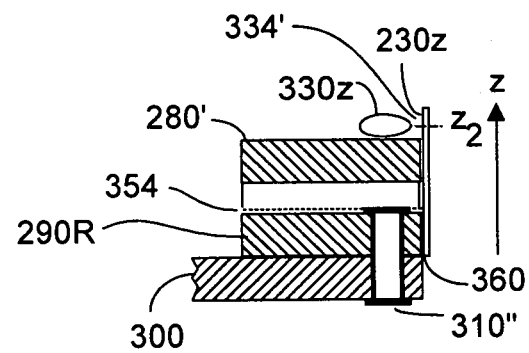

FIGS. 3A-1 and 3A-2 are simplified cross-sectional views through the region of second light source 330z in FIG. 3A. As shown, second light sensor array 230z is preferably mounted to member 290R so as to move freely with this member as the member is moved in the (x,y) plane by user movements of control element 320". However the plane of array 230z remains normal to member 290R and may, for example, be joined to the right vertical edge of member 290R with adhesive 360, or may be attached to member 290R with a small right angle bracket (not shown). As such sensor 230z is normal to the plane of base member 220 and is normal to the plane of virtual boundary box 340. In FIG. 3A-1, the user has slightly lifted control element 320", and consequently member 280' is slightly pivoted vertically about pivot axis 354 away from member 290R. The vertical magnitude of z on array 230z whereat optical energy 334' from light source 330z is detected is shown as magnitude $z_1$.

In FIG. 3A-2, the user has lifted control element 320" even higher in the z-direction, through a larger lift angle t than was the case for the slight lifting depicted in FIG. 3A-1. In FIG. 3A-2, light rays 334' from light source 330z impinge higher up on sensor 230z, at a magnitude $z_2$ that is greater than magnitude $z_1$ in FIG. 3A-1. Thus if the lift angle corresponding to what is depicted in FIG. 3A-1 is $\phi_1$, a greater lift angle $\phi_2$ corresponds to what is depicted in FIG. 3A-2. As noted FIGS. 3A-1 and 3A-2 are somewhat simplified. For example it is understood that the ends of pivot-permitting rivet 310" may of course be recessed into the outer surfaces of members 290R and 300, and that the configuration shown is intended to be exemplary only. While pivot-permitting rivet 310" is depicted as having a hollow shaft in FIG. 3A-1 and FIG. 3A-2, it could of course have a solid shaft. In FIG. 3A-1 and FIG. 3A-2 it may be said that a second exit location for optical energy from second light source 330z is moved in the z-direction (commensurate with z-direction movement of the control element) for detection by second light sensor array 230z. In FIG. 3A-1 and FIG. 3A-2 this second exit location is of course the light-exiting region of second light source 330z adjacent (but not touching) second light sensor 230z.

Figures 3, 3A:
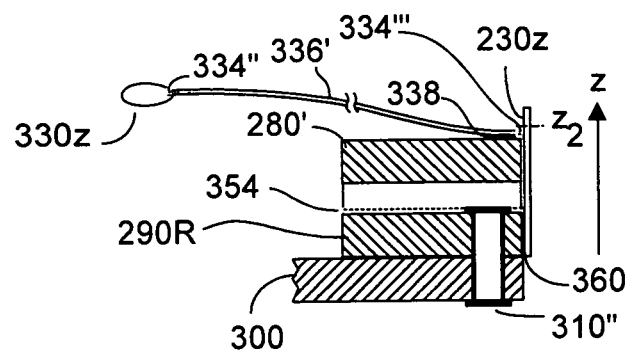

FIG. 3A-3 depicts an embodiment in which use of a preferably flexible fiber optic cable 336' enables second light source 330z to be mounted remotely from a region adjacent second light sensor array 230z. Optical energy rays 334" exiting second light source 33z are coupled through fiber optical cable 336' and exit at the distal end of the fiber optical cable as optical energy rays 334". The nomenclature 334'" denotes that the exiting optical energy rays have perhaps been attenuated within the fiber optical cable and/or by any pinhole mask at the distal end of the fiber optical cable. (As was described with reference to FIG. 2C, a pinhole mask or other mechanism can be used at the distal end of fiber optic cable 336' to restrict diameter of exiting optical energy 334", which energy falls upon second light sensor 230z.) Preferably the distal end of fiber optic cable 336' is secured to member 280', for example with a bracket or adhesive 338. The distal end of fiber optical cable 336' may be termed the exit location of detectable optical energy rays 334". It is seen from FIG. 3A and from FIG. 3A-3 that vertical displacement of control element 320" causes member 280' to move up or down vertically through various lift angles $\phi$. As member 280' moves vertically, optical energy rays 334" from second light source 330z impinge upon second light sensor array 230z at different z-axis locations, to be detected. Stated differently, a second exit location for optical energy rays 334'" emitted by second light source 330z is moved in the z-direction (commensurate with z-direction movement of the control element), and this second exit location is detected by second light source array 230z as z-coordinate data. This second exit location is of course the distal end of fiber optic cable 336' adjacent (but not touching) second light sensor array 230z.

Figure 3B:
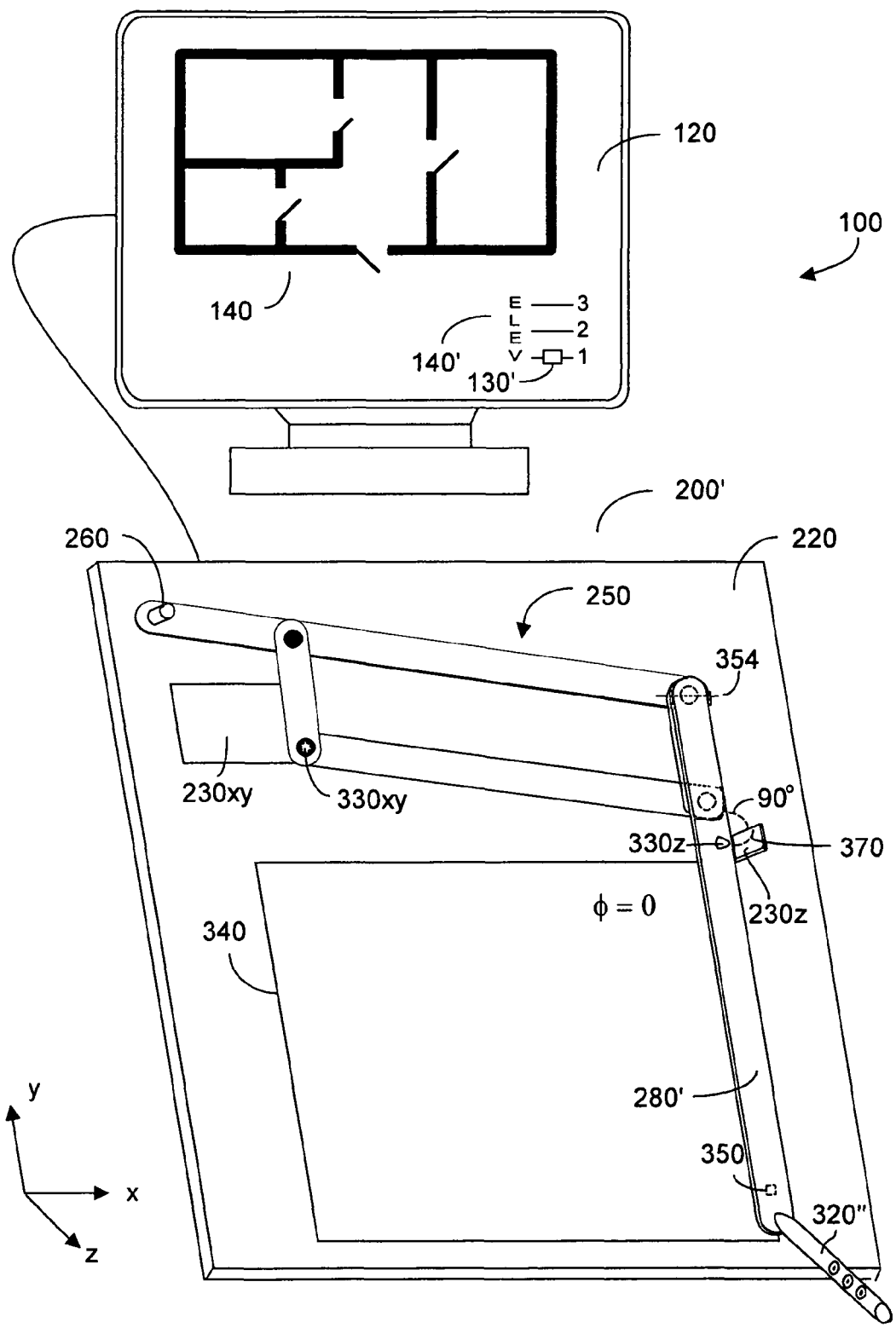
FIGS. 3B-3D depict the embodiment of FIG. 3A, showing exemplary use of z-axis movement, according to embodiments of the present invention.
Figure 3C:
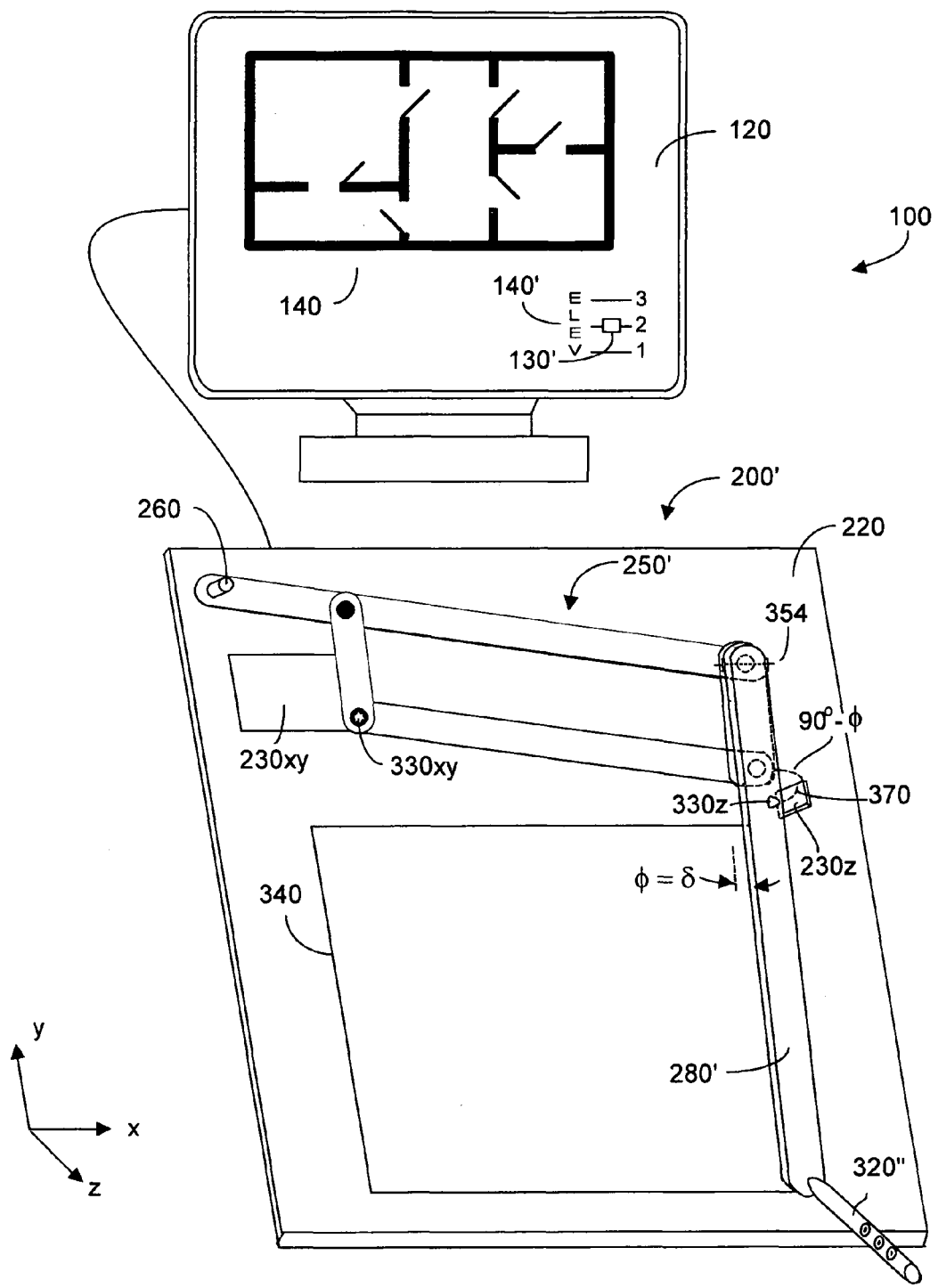

FIG. 3B-FIG. 3C show the embodiment of FIG. 3A, used with a software application executed by companion device system 100, here an architectural drawing routine that can display any of several floors of a building. Keyboard 150 is not depicted to avoid cluttering these figures.) In FIG. 3B, the user has not lifted control element 320" vertically, which is to say lift angle $\phi=0°$, and the displayed object 140 is the ground level plan view of the building being designed or reviewed by the user. At the lower right region of monitor display 120 there is seen an elevation scale 140' with a cursor 130' whose vertical position on elevation scale 140' is determined by lift angle $\phi$, according to the software application being executed by the companion device, here computer system 100. In FIG. 3B, lift angle $\phi=0°$, which is understood by the software application to mean that the plan view for the first or ground floor is to be displayed, which it is.

By contrast, in FIG. 3C the user (not shown) has lifted control element 320" somewhat and thus the distal end of member 280' vertically, through a lift angle $\phi=\delta°$ about pivot axis 354. Note that cursor 130' is now shown on the monitor display at elevation 2 in elevation scale 140', and accordingly displayed object 140 is now the second floor of the building under consideration. The user need not lift control element 320" precisely through angle $\phi=\delta°$. The associated software application can readily quantize the lift angle to the closest multiple of $\phi$. Thus if the user lifts control element 320" through an angle of about 0.6$\delta$ to about 1.4$\phi$, the software will assume the angle is 1$\phi$, etc. Note in FIG. 3C that less of locus path 370 is depicted because upward lifted member 280' is blocking a lower region of the arced path (which path is not visible in any event). However the height of the region of locus path 370 whereat optical energy rays from source 330z are detected by array 230z will represent magnitude of z.

Figure 3D:
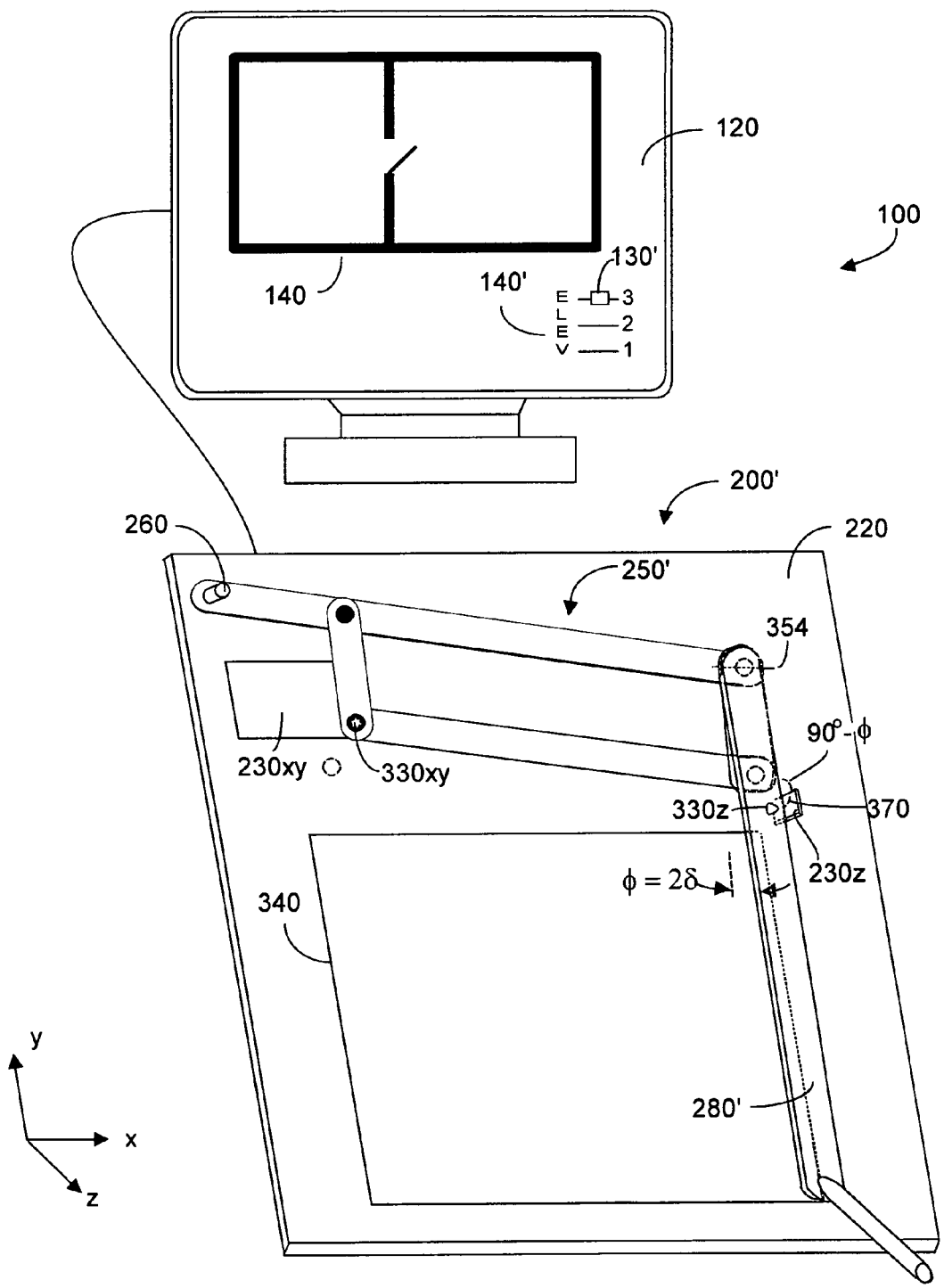

In FIG. 3D, the user has further lifted control element 320" through a lift angle of φ=2δ° about pivot axis 354. Cursor 130' has correspondingly moved further upward to elevation 3 on the display, and the primary displayed object 140 is now the third floor, perhaps the attic in that only two rooms are portrayed, of the building under consideration. Note that even less of potential locus path 370 is depicted, as lifted upward member 280' is blocking even more of the lower region of the arced path. Understandably magnitude of z along locus 370 whereat optical energy from source 330z is detected by array 230z is greater at lift angle 2φ than was the magnitude of z in FIG. 3C for lift angle 1φ.

Depending upon the software, the user may be able to rapidly move control element 320" up and down, to cause a superposition of the three architectural views shown in FIGS. 3B, 3C, and 3D. It is understood that what is depicted is but an example of what may be accomplished using a pointing device with three-dimensional (x,y,z) sensing capability, according to embodiments of the present invention.

The usefulness of an ability to sense z-axis displacement in a pointing device described with respect to FIG. 3A-3D is but exemplary. Many useful application gestures and companion device commands are in a sense attained by accessing the z-dimension. In some applications, lifting the control element in the z-dimension may command the pasting in of a previously stored user signature onto a document that is perhaps to be sent as an email attachment or perhaps via FAX. In some applications lifting the control element in the z-dimension and then perhaps drawing a small circle clockwise in the air plane may command an application being executed by the companion device to perhaps change line color from black to red, and perhaps drawing a small circle counter-clockwise in the air may command yet another line color. The application software may recognize many gestures drawn in the air (z>0), perhaps a virtual check-mark to command a certain function, perhaps a virtual letter "v" or perhaps an inverted letter "v" to command another function. Such virtual functions would be input to the application software by the user, much similarly to mapping certain keyboard key combinations to select and input character symbols in a word processing application. Even though these and other gestures are drawn with the control element lifted off the surface of the boundary box plane, the first light sensor array will nonetheless track (x,y) movements, even when made in the air, e.g., z>0, which is to say lift angle φ>0.

One advantage of sending control commands to the companion device by lifting and perhaps then drawing in the air (z>0, φ>0) is that this can be done without removing a hand from the keyboard (if one is being used) and without the user having to look away from the monitor display. In some applications, perhaps selecting a desired Chinese kanji, the user might initially press a keyboard key to bring up a selection of potential kanji, and then lift the control element upward and/or lift upward and draw a virtual gesture to cause a more suitable kanji or more suitable set of kanji to appear. Perhaps a downward movement of the control element to a rest, z=0, position commands the selection of the desired kanji. This and other applications can be used more readily than with prior art selection mechanisms, with the further advantage that likelihood of RSI is reduced in the process.

Figure 4A:
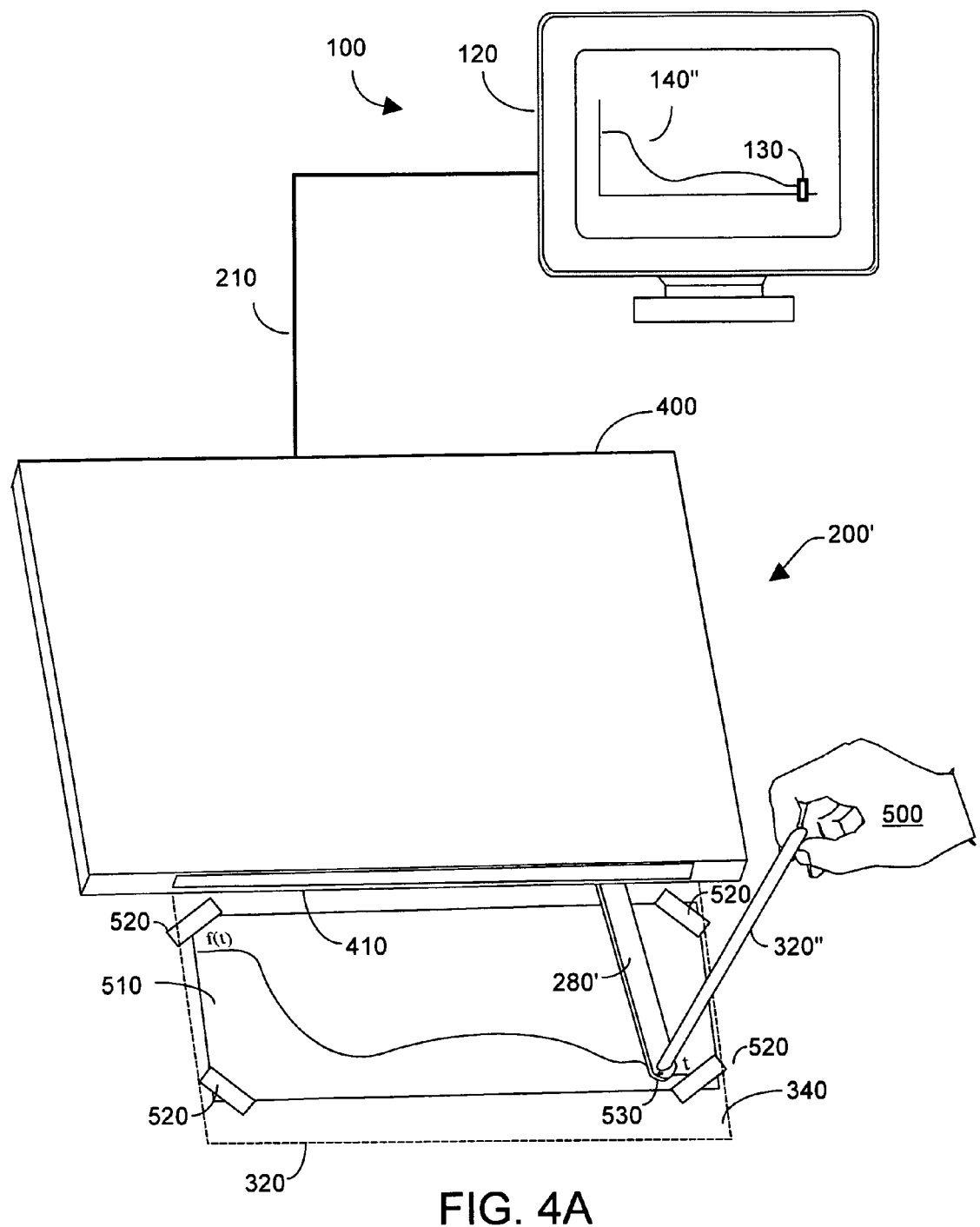
FIG. 4A depicts an exemplary housing for and tracing capabilities of embodiments of the present invention.

FIG. 4A depicts a pointer device 200' disposed within a protective housing 400, which housing defines an opening slot 410 through which the distal portion of member 280' extends. If desired slot 410 could be covered from within the housing with a sheet of foam within which a horizontal slit is cut, such that the distal portion of member 280' extends from this slit. Since the foam is flexible, lifting control element 320" and thus the distal end of member 280' upward is accommodated. The use of a foam sheet would further protect dust from entering into housing 400 through opening slot 410. For ease of illustration such optional sheet of foam is not depicted in FIG. 4A. It is understood in FIG. 4A that the figure is not to scale, and that housing 400 in reality is much smaller than monitor 140. Shown in phantom within housing 400 for reference are first light sensor array 230xy and swivel mount 260 (see FIG. 1A). In FIG. 4A user 500 is shown using control element 320" to trace a graph f(t) that exists on a piece of paper 510, which paper is attached at the corners with tape 520 to the surface of a table or whatever housing 400 rests upon. Boundary box 340 is simply a virtual drawing region within which the user may manipulate control element 320". If desired, housing 400 could be split horizontally with the upper housing surface (or lid} hinged horizontally at the rear of the housing. This would enable a user wishing to lift control element 320" (and thus lift the distal end of member 280') upward a substantial distance in the z-direction to do so. Rather than have such upward movement constrained by the upper edge of slot 410 in a one-piece housing, the housing lid would simply hinge slightly open.

In FIG. 4A and in all of the various embodiments it is preferred that the lower distal surface of member 280' (or 280 in other figures) have a small projecting point 530 beneath the attachment between the member and control element 320" (or 320 or 320'). Projecting point 530 can help guide the user when doing fine work such as tracing a graph or perhaps a signature or drawing a signature. Note that monitor 140 displays as 140" nearly all of the f(t) vs t graph that the user has nearly finished tracing. Cursor 130 is displayed near the lower right region of monitor 140 on an end region of the graph. This is commensurate with the user having traced nearly all of the graph, with the control element 320", actually projecting point 530 of the control element, being in the lower right region of bounding box 320. If the user continues to move the control element further to the right to complete tracing the graph, cursor 130 will move further to the right on monitor 140 and more of the graph will be traced.

Tracing can be facilitated by making all or at least the distal region of member 280' (or 280 in other figures) transparent, to let the user see projection point 530 on the underside of member 280' (or 280). In FIG. 4A, the graph being traced is perhaps from an analog device, and it is desired to try to represent this f(t) vs t graph mathematically. In FIG. 4A, once the graph has been accurately traced using the present invention 200', software associated with companion device 100 can approximate a mathematical function representing the graph.

Figure 4B:
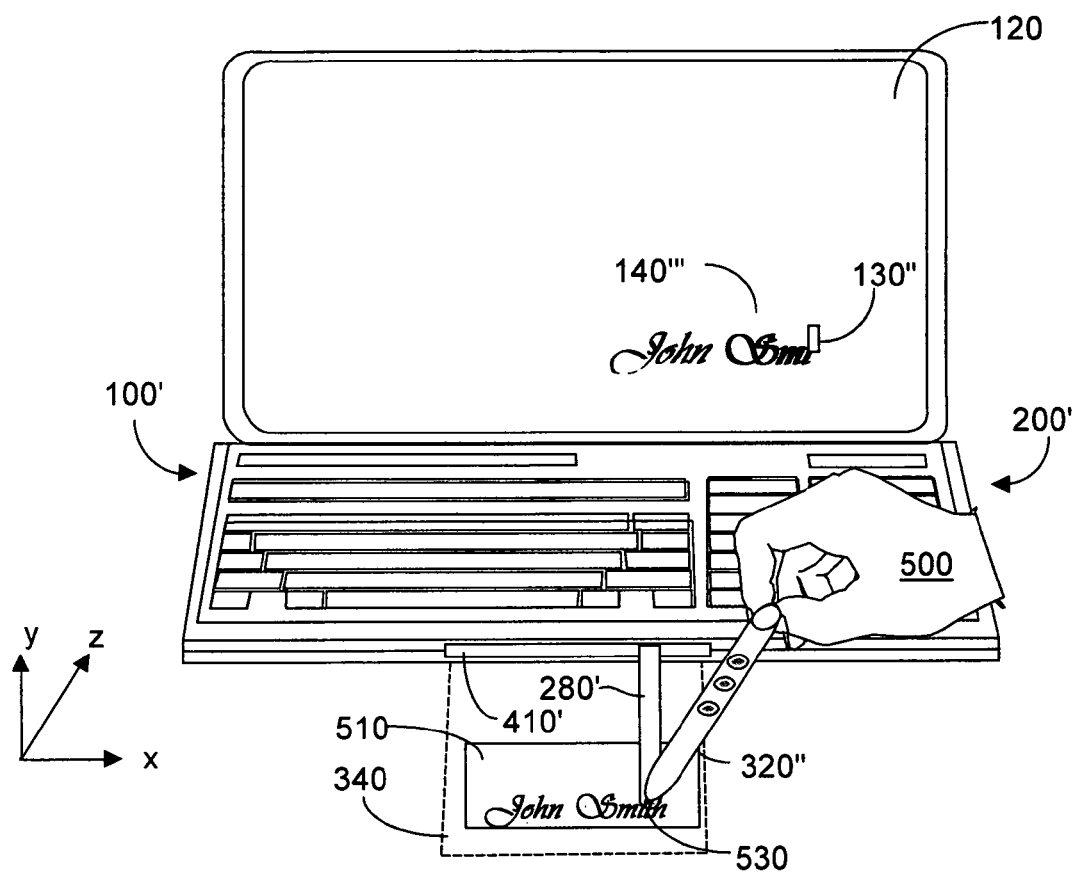
FIG. 4B depicts an embodiment of the present invention housed within the keyboard of a laptop computer companion device.

FIG. 4B depicts a pointer device 200' such as shown in FIG. 3A disposed within the keyboard region of a companion device, a laptop computer system 100'. The distal portion of member 280' is shown projecting from a slot 410' defined in the front edge of laptop 100'. It is understood that pentagram element 280' and preferably detachably replaceable control element 320" could protrude from the left or right side of the laptop, rather than from the front as shown. In FIG. 4B the user is tracing the signature "John Smith" from a piece of paper 510 placed within virtual boundary box 340. Here boundary box 340 is defined on the table or whatever other surface laptop 100' is resting upon. As user 500 manipulates control element 320", the projecting point 530 on the underside of member 280' is moved by the user to trace the signature. Display screen 120 shows a portion of the signature 140''', here "John Smi" as having been partially traced, with the user perhaps now getting ready to "dot the i" or perhaps getting ready to trace the "th" in the surname Smith. The user can then lift control element 320" and return to "dot the i" and "cross the t" in the surname.

On display 120, cursor 130" shows that the signature has been traced through the "i" in "Smith", which corresponds to where projection 530 beneath member 280' below the distal end of control element 320" is with respect to the "i" portion of the signature on paper 510. Note that the "i" being traced is near the bottom right region of boundary box 340, and correspondingly cursor 130" is near the bottom right region on display 120. In this example, assume after tracing the characters "John" the user has intentionally lifted control element 320" in an upward gesture to change line width, as suggested by FIG. 3A to invoke a thicker line stroke. Thus in FIG. 4B, the surname "Smith" is shown as being rendered on display 120 with a broader line than was selected by the user for the first name "John". This as well as the ability to "dot i's" and "cross t's", etc. is but one example of the flexibility provided by an absolute coordinate, three-dimensional embodiment of the present invention as depicted in FIG. 4B.

If the user were handwriting the signature "John Smith" rather than tracing, having written the "John Smith" without yet dotting the "i" or crossing the "t", the user would lift the control element upward ($\phi$>0). Looking at display 120 the user would move the control element (still lifted upward, as though it were a pen or pencil) until cursor 130" was above the undotted "i". The user would then lower the control element (until $\phi$=0) to literally put the dot on the "i". The user could then lift and move the control element until cursor 130" was in a position to cross the "t", and then lower the control element (until $\phi$=0) and make the stroke in the (x,y) plane to literally cross the "t". (It will be appreciated that cursor 130" could be rendered as crosshairs or a tiny circle rather than as a rectangle as shown in FIG. 4B and the other figures.) This type of continuation tracing or indeed original signature writing is simply not feasible with prior art mice, trackballs, and the like. Such prior art mechanisms lose track of where they are when the user either lets go of the device or moves the device away from the work surface.

This ability for the user to move and/or to lift control element 320" and then return to a portion of a locus made by control element 320", e.g., a signature, and augment the locus, e.g., by added a "dot" above the letter "i" or adding a horizontal "dash" to cross the letter "t" in a signature "Smith" is readily achieved by embodiments of the present invention.

As noted, in the displays shown in FIG. 1A-FIG. 1D, FIGS. 3A-3D, FIGS. 4A and 4B, the position of cursor 130 on display screen 120 will always correspond to the position of control element 320 on bounding box 340 of pointing device 200, more precisely with the position of the downward projection 530 on the underside of member 280 or 280'. This is what is meant by the statement that pointing device 200 or 200' is an absolute coordinate device; one can always tell generally the position of cursor 130 on display screen 120 simply by looking at the general position of control element 320 with respect to boundary box 340. In addition, the position of cursor on the display screen will remain even if the user lets go of the control element. Preferably at least the distal end region of pantograph element 280, 280' is made of a transparent material, e.g., clear plastic, to provide a clear view of downward projection 530. This makes it becomes quite easy for the user to trace a curve with the control element, perhaps a mathematical curve, on a piece of paper placed over bounding box 340. The user simply sees right through pantograph element 280, 280' to what is being traced underneath. Similarly one could use the control element to write on signature on the bounding box. In the first instance the mathematical curve would appear on the display screen, and in the second instance the signature would appear on the display screen. Indeed using the present invention, one could write a portion of a signature with the control element on the bounding box, pause and get a cup of coffee, return and continue moving the control element to finish writing the signature. Such functionality is simply not possible with conventional pointing devices. Using the present invention one could write the signature even in the dark.

To summarize, in the various described embodiments, the path or locus of movement of the distal end of pantograph element 280 or 280' responsive to user manipulation of the control element in the (x,y) plane will be coupled to first light sensor array 230$xy$ as a moving locus of optical energy rays emitted at a first exit location from first light source 330$xy$. Output from this first light sensor array will be in the (x,y) Cartesian coordinate format that a standard mouse type device generates. Vertical or z-axis movement of the control element will be coupled to second light sensor array 230$z$ as optical energy rays emitted at a second exit location from second light source 330$z$. The actual z-axis Cartesian coordinate is available directly from second light source 330$z$ and may be exported as part of (x,y,z) coordinate data. If needed, actual lift angle $\phi$ may be provided from a lookup table or the like. In various embodiments, in sensing control element movement in the (x,y) plane and/or in the z-axis, optical energy rays from the first and/or second light source may be presented directly to or coupled via fiber optic cable to the associated first or second light sensor array.

It will be appreciated that the user is manipulating a perhaps 0.25 oz. mass when using device 200 or 200', according to embodiments of the present invention. This low mass together with user selection of the type of control element substantially reduces likelihood of RSI to the user. Note too that use of the present invention is substantially frictionless, and that no physical contact between light sources and respective light sensors occurs. Consequently light-weight pantographs made of plastic or the like suffice, which promotes low mass and low production cost for the present invention. These aspects as well as the absolute coordinate functionality provided contribute to the utility of embodiments of the present invention.

Modifications and variations may be made to the disclosed embodiments without departing from the subject and spirit of the invention as defined by the following claims.

What is claimed is:

1. An absolute coordinate pointing device manipulatable by a user to control at least cursor position on a display on a companion device, the absolute coordinate pointing device comprising:

a base, defining an (x,y) plane including a drawing region surface defined within a boundary box, said (x,y) plane being orthogonal to a vertical z-axis;

a user manipulable control element having a first end and a second, distal, end;

a movable first light source outputting first optical energy rays at a first exit location that moves in said (x,y) plane with movement of said first end of said control element in said (x,y) plane;

a stationary, relative to said (x,y) plane, first light sensor array disposed to receive at least some of said first optical energy rays directly output from said first exit location;

wherein said stationary first light sensor array outputs (x,y) Cartesian coordinate data commensurate with (x,y) plane movement of said first end of said control element, which (x,y) Cartesian coordinate data is coupleable to said companion device to at least control position of said cursor position on said display; and wherein position of said control element relative to said boundary box is indicative of position of said cursor on said display, even when said control element is not being held by a user of said pointing device; and means for optically sensing z-axis displacement of a region of said control element, said means for optically sensing z-axis displacement outputting (z) Cartesian coordinate data commensurate with z-axis displacement of said first end of said control element, which (z) Cartesian coordinate data is coupleable to said companion device.

2. The absolute coordinate pointing device of claim 1, further including means for scaling (x,y) movement of said first end of said control element relative to (x,y) movement of said first exit location of at least some of said first optical energy rays from said movable first light source, disposed between said first end of said control element and said first exit location of said at least some of said first optical energy rays from said movable first light source.

3. The absolute coordinate pointing device of claim 1, further including a scaling mechanism disposed between said first end of said control element and said first exit location of said at least some of said first optical energy rays from said movable first light source;

said scaling mechanism scaling (x,y) movement of said first end of said control element relative to (x,y) movement of said first end of said control element relative to (x,y) movement of said at least some of said first optical energy rays from said movable first light source.

4. The absolute coordinate pointing device of claim 1, further including a pantograph mechanism disposed between said first end of said control element and said first exit location of said at least some of said first optical energy rays from said movable first light source;

said pantograph mechanism scaling (x,y) movement of said first end of said control element relative to (x,y) movement of said first exit location of said at least some of said first optical energy rays from said movable first light source.

5. The absolute coordinate pointing mechanism of claim 1, wherein:

said movable first light source outputs said first optical energy rays directly to said stationary first sensor array, such that said first exit location is a region of said movable first light source adjacent said stationary first sensor array.

6. The absolute coordinate pointing mechanism of claim 1, further including a first fiber optic cable having a first end disposed adjacent said movable first light source and having a second end adjacent said stationary first light sensor array;

wherein said second end of said first fiber optical cable is said first exit location of said at least some of said first optical energy rays from said movable first light source.

7. The absolute coordinate pointing mechanism of claim 2, wherein:

said movable first light source is affixed to said means for scaling; and said first exit location is a region of said movable first light source adjacent said first sensor array.

8. The absolute coordinate pointing mechanism of claim 3, wherein:

said movable first light source is affixed to said scaling mechanism; and said first exit location is a region of said movable first light source adjacent said first sensor array.

9. The absolute coordinate pointing mechanism of claim 3, wherein:

said movable first light source is affixed to said a pantograph mechanism; and said first exit location is a region of said movable first light source adjacent said stationary first sensor array.

10. The absolute coordinate pointing mechanism of claim 1, wherein said means for optically sensing z-axis displacement includes:

a movable second light source outputting second optical energy rays at a second exit location that moves on said vertical z-axis with vertical movement of said first end of said control element;

a stationary, relative to said z-axis, second light sensor array disposed to receive at least some of said second optical energy rays at said second exit location;

wherein said stationary second light sensor array outputs said z Cartesian coordinate data commensurate with vertical movement of said first end of said control element vertically.

11. The absolute coordinate pointing mechanism of claim 10, further including:

a pantograph mechanism disposed between said first end of said control element and said first exit location of said at least some of said first optical energy rays from said movable first light source;

said pantograph mechanism including at least one pivotable member having a first distal end attached to said control element and having a second end hingedly mounted to said pantograph mechanism to permit pivoting vertically along said z-axis without permitting (x,y) rotation;

said second exit location is affixed to said at least one pivotable member.

12. The absolute coordinate pointing mechanism of claim 11, wherein:

said movable second light source is affixed to said pivotable member such that said second exit location is a region of said movable second light source adjacent said stationary second light sensor array.

13. The absolute coordinate pointing mechanism of claim 10, further including a second fiber optic cable having a first end and a second end; wherein:

a first end of said fiber optic cable is adjacent said stationary second light source; and said second end of said fiber optic cable is said second exit location.

14. The absolute coordinate pointing device of claim 1, wherein said companion device includes at least one device selected from a group consisting of (a) a PC, (b) a laptop computer, (c) a netbook computer, and (d) a kiosk.

15. The absolute coordinate pointing device of claim 1, further including a housing to house said absolute pointing device, wherein said housing is selected from a group consisting of (a) a stand-alone housing, (b) a housing for a keyboard, (c) a housing for a laptop computer, and (d) a housing for a netbook computer.

16. An absolute coordinate pointing device manipulatable by a user to control at least cursor position on a display on a companion device, the absolute coordinate pointing device comprising:

a base, defining an (x,y) plane including a drawing region surface defined within a boundary box, said (x,y) plane being orthogonal to a vertical z-axis;

a user manipulable control element having a first end and a second, distal, end;

a movable first light source outputting first optical energy rays, disposed to be moved in said (x,y) plane with movement of said first end of said control element in said (x,y) plane;

a stationary, relative to said (x,y) plane, first light sensor array disposed to receive at least some of said first optical energy rays directly output from said movable first light source;

a movable second light source outputting second optical energy rays, disposed to be moved on said vertical z-axis with vertical movement of said first end of said control element;

a stationary, relative to said z-axis, second light sensor array disposed to receive at least some of said second optical energy rays directly output from said movable second light source;

wherein said stationary first light sensor array outputs (x,y) Cartesian coordinate data commensurate with (x,y) plane movement of said first end of said control element, and said stationary second light sensor array outputs z-axis Cartesian coordinate data commensurate with z-axis movement of said first end of said control element;

wherein at least one of said (x,y) Cartesian coordinate data and said z-axis Cartesian coordinate data is coupleable to said companion device to at least control position of said cursor position on said display; and wherein position of said control element relative to said boundary box is indicative of position of said cursor on said display, even when said control element is not being held by a user of said pointing device.

17. The absolute coordinate pointing device of claim 16, further including, disposed between said first end of said control element and a location of said movable first light source, at least one of (a) means for scaling (x,y) movement of said first end of said control element relative to (x,y) movement of said location of said movable first light source, (b) a scaling mechanism to scale (x,y) movement of said first end of said control element relative to (x,y) movement of said movable first light source, and (c) a pantograph mechanism to scale (x,y) movement of said first end of said control element relative to (x,y) movement of said movable first light source.

18. The absolute coordinate pointing device of claim 16, further including a housing to house said absolute pointing device, wherein said housing is selected from a group consisting of (a) a stand-alone housing, (b) a housing for a keyboard, (c) a housing for a laptop computer, and (d) a housing for a netbook computer.

19. A method to provide absolute coordinate pointing of at least a cursor position on a display of a companion device responsive to user manipulation of a control element, the method including the following steps:

defining an (x,y) plane including a drawing region surface defined within a boundary box, said (x,y) plane being orthogonal to a vertical z-axis;

providing a user manipulable control element having a first end and a second, distal, end;

moving in said (x,y) plane with movement of said first end of said control element in said (x,y) plane a movable first light source that outputs first optical energy rays;

sensing with a stationary, relative to said (x,y) plane first light sensor array at least some of said first optical energy rays directly output from said movable first light source;

moving on said vertical z-axis with vertical movement of said first end of said control element a movable second light source outputting second optical energy rays;

sensing with a stationary, relative to said z-axis, second light sensor array at least some of said second optical energy rays directly output from said second exit location;

wherein said movable first light sensor array outputs (x,y) Cartesian coordinate data commensurate with (x,y) plane movement of said first end of said control element, and said movable second light sensory array outputs z-axis Cartesian coordinate data commensurate with z-axis movement of said first end of said control element;

wherein at least one of said (x,y) Cartesian coordinate data and said z-axis Cartesian coordinate data is coupleable to said companion device to at least control position of said cursor position on said display; and wherein position of said control element relative to said boundary box is indicative of position of said cursor on said display, even when said control element is not being held by a user.

20. The method of claim 19, further including scaling (x,y) movement of said first end of said control element relative to (x,y) movement of a location of said first optical rays from said movable first light source.

* * * * *